No. 849,130. PATENTED APR. 2, 1907.
A. HERON.
CATTLE GUARD.
APPLICATION FILED AUG. 26, 1905.
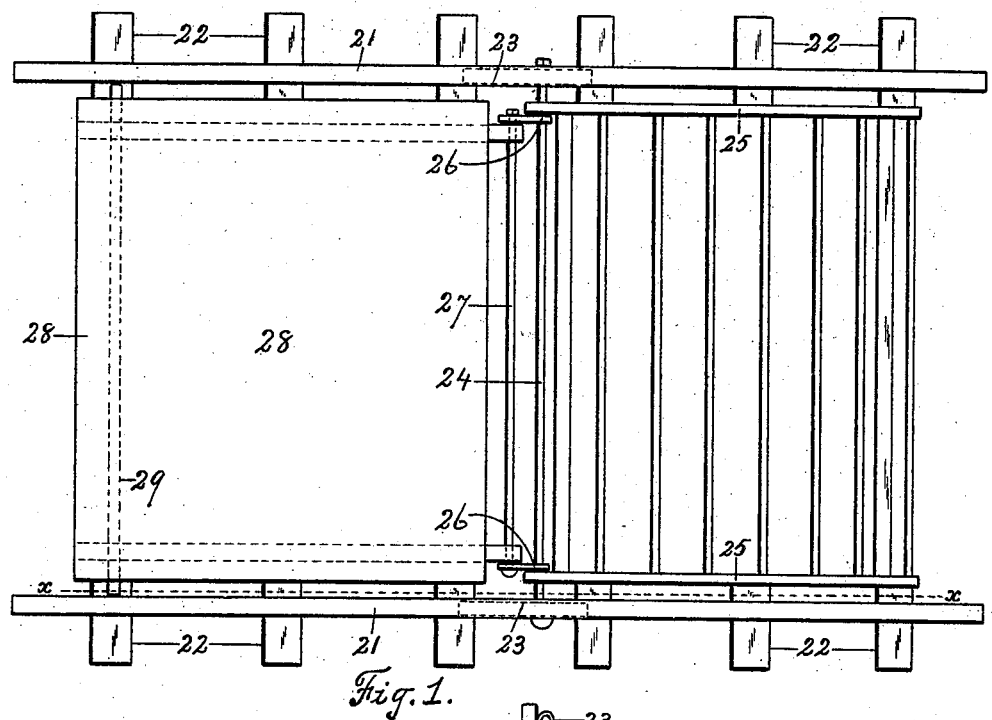
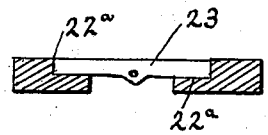
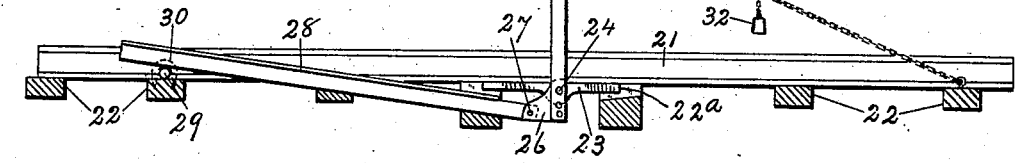
Witnesses
J. S. Edmunds
A. Byrick
Inventor
Alexander Heron
By P. J. Edmunds
Attorney

UNITED STATES PATENT OFFICE.

ALEXANDER HERON, OF CALDER, ONTARIO, CANADA.

CATTLE-GUARD.

No. 849,130. Specification of Letters Patent. Patented April 2, 1907.

Application filed August 26, 1905. Serial No. 275,977.

*To all whom it may concern:*

Be it known that I, ALEXANDER HERON, a subject of the King of Great Britain, and a resident of the village of Calder, in the county of Middlesex, in the Province of Ontario, Canada, have invented a new and useful Cattle-Guard, of which the following is a specification.

This invention relates to a device placed on a railroad-track adjacent to a railway-crossing to prevent the passing or straying of cattle from the road onto said railroad-track.

The object is to provide a cattle-guard that will be very strong and durable, one that may be applied to a railroad-track without cutting, boring, or otherwise interfering with the railroad-rails, one that will consequently be inexpensive to instal, one that will be inexpensive to manufacture, one the gate of which will be normally in a horizontal position, so that railroad-trains may pass and repass over it the same as if there was no such device on the railroad-track, one that is at the same time so sensitive or so balanced that the instant that an animal steps on the platform a pivotal gate will fly up or be instantly raised to a vertical position to completely prevent the passage of the animal over the device, and which gate falls to its lowered horizontal position the instant that the animal steps off said platform, and one the gate of which is provided with springs at its outer end in order to avoid and completely prevent it from being broken or otherwise injured when it falls from its raised to its lowered position.

It consists of the improved construction and novel combination of parts of the same, as will be hereinafter first fully set forth and described and then pointed out in the claim, reference being had to the accompanying drawings, wherein—

Figure 1 is a plan view of a cattle-guard embodying my invention, showing it in position between the rails of a railroad-track.
Fig. 2 is a sectional view on the line x x of Fig. 1, showing the gate elevated. Fig. 3 is another view of same, showing the gate lowered. Fig. 4 is a view in side elevation of one of the bearing-bars for the gate-shaft, the cross-ties in which said bar rests being shown in section.

In the accompanying drawings the numeral 21 designates the railroad-rails, and 22 the ties of a railroad-track to which said rails are firmly secured.

23 designate bearing-bars, formed of iron, wood, or other suitable material, which bars extend across and bridge the space between two of the adjacent ties 22. Two of these bearing-bars 23 are preferably employed, and they are held in place from moving laterally by having their ends inserted in sockets or recesses 22ª, to which they are fitted in the ties 22, and the upper faces of said bars are flush with the upper face of said ties, and said bars are located and held in place from moving vertically in said ties by being located in line with and directly under the rails 21, and when so secured said bars 23 are firmly and rigidly held in place without any possibility of accidental displacement and without the employment of bolts or other separate or additional securing devices, thus firmly securing said bearing-bars in place and in an inexpensive manner.

24 designates a shaft supported and held in place by and turning perfectly free in bearings in said bars 23.

25 designates a gate to the opposite sides of which plates 26 are rigidly secured, and said plates are pivotally mounted on the shaft 24.

27 designates a pivot-rod secured to and supported by said plates 26 and at the opposite side of the shaft 24 to that at which the gate 25 is secured to said plates.

28 designates a platform one end of which is pivotally secured to the pivot-rod 27.

29 designates a supporting-bar, which is secured by the staples 30 to the upper side of one of the ties 22 between the rails 21. This bar extends across the track and is round on the upper face, and on said upper face the platform 28 is supported near one end.

31 designates a chain secured at one end to one of the ties 22 and at the other end to the gate 25, and 32 designates a weight secured to said chain 31 midway between its ends.

33 designates springs secured to the upper outer end of the gate 25 and so arranged that when the gate 25 falls to a horizontal position said springs 33 will be interposed between said gate and the tie, which will ease the jar of the gate when it falls to a horizontal position on the ties, and thus avoid and completely prevent it from being broken or otherwise injured.

The practical advantages of a device constructed as described are as follows: The bearing-bars 23 being held down by the railroad-rails 21 and their ends being held in place in the sockets or recesses 22ª in the ties 22, said bearing-bars 23 are firmly and rigidly held in place without the employment of any separate or additional securing devices, and said bearing-bars 23 being so held in place and being very simple, and consequently inexpensive to manufacture, at the same time very strong and durable, the result is that a cattle-guard constructed as described is not only simple and inexpensive to manufacture, but inexpensive to install, and another great advantage is that it is very compact in its lowered position.

The weight of the platform 28 is almost the same as that of the gate 25, the latter, however, in connection with the chain 31, with or without the weight 32, overbalances the platform 28, which practically balances this device or renders it so sensitive that the instant that an animal steps on the platform 28 the gate 25 will fly up to a vertical position and completely prevent the passage of the animal.

The springs 33 on the outer end of the gate 25 being arranged at the same distance from shaft 24 as the tie on which the outer end of the gate will rest when in its lowered position, all possibility of the gate 25 being broken or otherwise injured when falling to its lowered position will be avoided and completely prevented.

In the accompanying drawings this invention is shown only between the rails of a single railroad-track; but similar constructions may be placed in position between the rails of one or more tracks or between double tracks or between the railroad-track and the fences on the roadway at opposite sides of the railroad-track.

Having thus described my invention, I claim—

In a cattle-guard, the combination with the rails and ties of a railway-track, bearing-bars mounted on the ties, a shaft carried by said bearing-bars, said shaft extending entirely across the track, a gate, springs on the free end of the gate at each side thereof, the other end of the gate pivotally mounted on said shaft, plates rigidly carried by the pivoted end of said gate, a second shaft running parallel to said first-named shaft, said shaft being carried by the plates of the gate, a platform mounted on said second-named shaft, a supporting-bar 29, said supporting-bar adapted to support the free end of said platform, and means comprising a chain and weight for limiting the movement of, and returning the gate, substantially as described.

In testimony whereof I have signed in the presence of the two undersigned witnesses.

ALEXANDER HERON.

Witnesses:
P. J. EDMUNDS,
A. BYRICK.